United States Patent [19]

Okano et al.

[11] Patent Number: 6,067,102
[45] Date of Patent: May 23, 2000

[54] ELECTROPHOTOGRAPHIC RECORDING DEVICE AND EXPOSURE CONTROLLING DEVICE THEREFOR

[75] Inventors: Mamoru Okano, Hitachi; Shinya Kobayashi, Mito; Nobuyoshi Hoshi, Hitachinaka, all of Japan

[73] Assignees: Hitachi, Ltd.; Hitachi Koki Co., Ltd., both of Tokyo, Japan

[21] Appl. No.: 08/945,237

[22] PCT Filed: Apr. 26, 1995

[86] PCT No.: PCT/JP95/00824

§ 371 Date: Oct. 17, 1997

§ 102(e) Date: Oct. 17, 1997

[87] PCT Pub. No.: WO96/34320

PCT Pub. Date: Oct. 31, 1996

[51] Int. Cl.[7] .............................. B41J 2/385; G03G 13/04; G03G 15/04
[52] U.S. Cl. ............................................. 347/131; 399/181
[58] Field of Search .................................... 347/131, 211, 347/232, 129, 251, 900; 399/181; 382/176, 209, 254, 258, 269; 345/136; 358/296, 298, 300, 532, 534, 536, 429, 447, 448, 456, 459, 462

[56] References Cited

U.S. PATENT DOCUMENTS

| | | | |
|---|---|---|---|
| 4,437,122 | 3/1984 | Walsh et al. | 348/625 |
| 4,450,483 | 5/1984 | Coviello | 348/26 |
| 4,847,641 | 7/1989 | Tung | 347/131 |
| 5,077,805 | 12/1991 | Tan | 382/137 |
| 5,329,559 | 7/1994 | Curry et al. | 382/266 |
| 5,430,472 | 7/1995 | Curry | 347/232 |
| 5,479,584 | 12/1995 | Curry | 358/447 |
| 5,483,351 | 1/1996 | Maillous et al. | 382/254 |
| 5,519,426 | 5/1996 | Lukis et al. | 347/211 |
| 5,592,207 | 1/1997 | Kobayashi et al. | 347/129 |
| 5,666,470 | 9/1997 | Parker | 358/447 |
| 5,812,742 | 9/1998 | Hanyu | 358/447 |
| 5,841,148 | 11/1998 | Some et al. | 250/584 |

*Primary Examiner*—N. Le
*Assistant Examiner*—L. Anderson
*Attorney, Agent, or Firm*—Antonelli, Terry, Stout & Kraus, LLP

[57] ABSTRACT

In an electrophotographic printing apparatus for printing using a three level printing method, there are provided a first color data memory and a second color data memory which memorize the pixel data of every color sent from host equipment, such as a computer connected to an electrophotographic printing apparatus, and by the use of image recognition equipment for judging whether pixel information is part of what image, exposure information with exposure equipment is determined so that the electric current flowing into electric current source and electric current source is changed. With such an arrangement, the exposure data for every color to be printed is created on the basis of the recognized result the part of a particular image that the pixel data shows, and the color image of the line-width in accordance with data sent from the host equipment to the electrophotographic printing apparatus can be actually printed by controlling the exposure beam diameter.

9 Claims, 8 Drawing Sheets

FIG.6
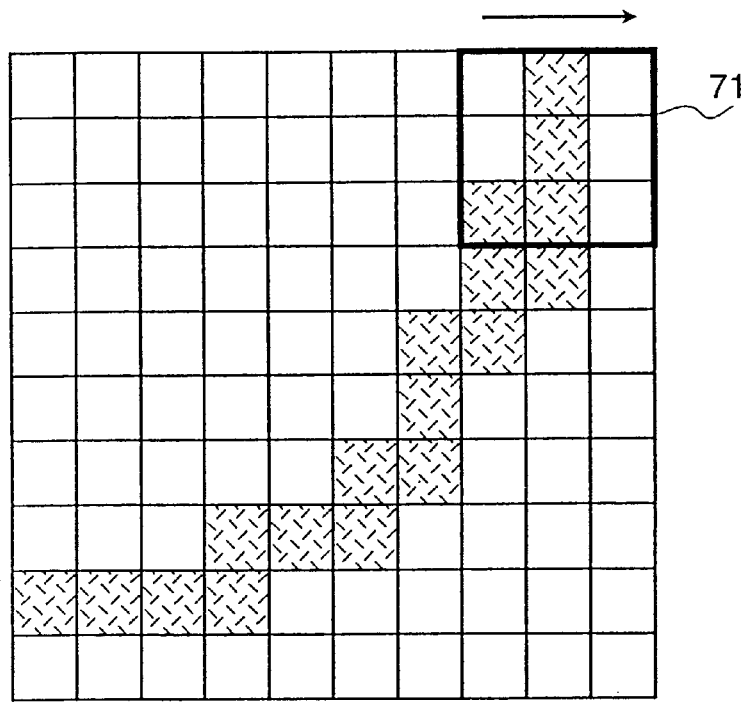
FIG.7(a)  FIG.7(b)  FIG.7(c)  FIG.7(d)
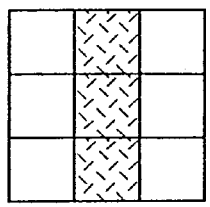 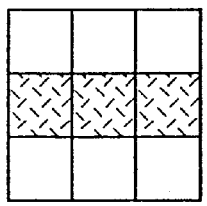 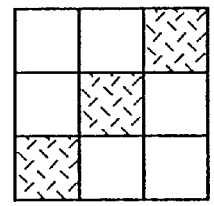 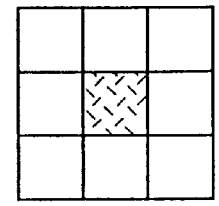

ELECTROPHOTOGRAPHIC RECORDING DEVICE AND EXPOSURE CONTROLLING DEVICE THEREFOR

BACKGROUND OF THE INVENTION

The present invention is concerned with an electrophotographic printing apparatus for printing an image using an electrophotographic method, and more particularly, it relates to an exposure controlling device for the apparatus.

A conventional electrophotographic method (a so-called three level printing method) comprises the steps of forming an electrostatic latent image consisting of two electric potential levels and a nonprinting electric potential level in one exposure for developing an image in two colors. This method is disclosed in Japanese patent Laid-open print No. 48-37148. In this method, an electrostatic latent image consisting of three electric potential levels is formed by irradiating a photosensitive member with light modulated on the basis of image information after uniformly charging the photosensitive member surface using a charger.

In the method of printing an image using the above-mentioned electrophotographic method on the basis of inputted image information, an electrostatic latent image consisting of plural printing levels and a nonprinting level is formed by exposing a photosensitive member surface that has been uniformly charged, and then the electrostatic latent image is developed to form a toner image. The larger the exposure quantity of light irradiated on the photosensitive member, the smaller the surface potential of the photosensitive member becomes. Therefore, when the exposure quantity is changed to form an electrostatic latent image in the form of a line image with the same beam diameter, the larger the exposure quantity, the larger the width of the latent image becomes, and the surface potential of the photosensitive member declines from the initial state.

In printing a line image, the line-width of an actual image becomes thicker than the line-width indicated by the image data because an electric field due to the spatial potential change of the electrostatic latent image itself is generated. In order to compensate for this phenomenon, a method of changing the exposure quantity to be irradiated on the photosensitive member according to the kind of printing image was proposed in a conventional two level printing method. In the Japanese patent publication No. 62-26621, for example, a method is disclosed wherein, when a printing image is recognized as a line image the exposure quantity is lowered when the photosensitive member surface is exposed to light modulated on the basis of image information. As a result, the thickening of lines after development is suppressed.

While the three level printing method has an advantage in that two color printing having no position dislocation can be performed at the same printing speed as a single color printer, because a latent image for two colors is formed by one exposure, changing the exposure quantity and thickening of the lines will occur for one color in the printing of the line image.

There is also another problem in that thinning of lines in the other color also occurs. The cause of this phenomenon is that, when exposing the photosensitive member surface in order to form the electrostatic latent image of a line, the surface potential of the photosensitive member declines by a width which is larger than the optical beam diameter. Because the surface potential of the photosensitive member declines depending on the exposure quantity, the degree of thickening of some lines and thinning of other lines depends on the exposure quantity. Therefore, it is impossible to print proper images using only a conventional control method wherein the exposure quantity is varied after recognizing the kind of the printing image.

Thus, it is an object of the present invention to provide an electrophotographic printing apparatus that can print desired images corresponding to image data by determining a proper exposure quantity and controlling the exposure quantity accordingly in a three level printing method.

SUMMARY OF THE INVENTION

In order to achieve the above-stated object, the present invention employs, for an electrophotographic printing apparatus, an exposure unit which comprises a recognition unit for recognizing the image (color) of a printing image on the basis of input image data, a unit for operating on the exposure data of every color that is printed on the basis of the recognition result, and a unit for memorizing a proper exposure quantity for the exposure unit, which is set in advance on the basis of the characteristics of the developing agent being used and the sensitivity characteristics of the photosensitive member. The apparatus is further provided with a unit for measuring the sensitivity characteristics of the photosensitive member. Also, the apparatus is provided with a unit for calculating the proper exposure quantity for irradiation of the photosensitive member on the basis of a measured result of the sensitivity characteristics. The image data (dot information) from the host equipment, such as a large scale computer or OA equipment, is sent to a memory in the equipment according to the order of printing by the electrophotographic printing apparatus. The image pattern recognition equipment perceives the printing image, which is part of the printing image represented by a dot arrangement stored in a memory, and forms exposure data for each color based on this perception. The exposure data is formed so that the image is printed in accordance with image data without any thickening and thinning of images for any colors.

The sensitivity characteristics of the photosensitive member change as the temperature of the photosensitive member and the state of use change. A unit for measuring the sensitivity characteristics of the photosensitive member is provided, and by calculating the proper exposure quantity to be irradiated on the photosensitive member on the basis of the result of a sensitivity characteristic measurement, a proper electrostatic latent image can be formed even in a case where the sensitivity characteristics of the photosensitive member change.

BRIEF DESCRIPTION OF DRAWINGS

FIG. 6 is a diagram which illustrates the image recognition method of the present invention.

FIGS. 7(a) to 7(d) are diagrams which illustrate an image pattern to be detected.

DESCRIPTION OF THE PREFERRED EMBODIMENTS

EXAMPLE 1

Embodiments of the present invention will now be described with reference to the drawings. In a case where a color image is to be printed by an electrophotographic printing apparatus, the electrophotographic printing apparatus receives the image information concerning every pixel output from the host computer. The electrophotographic printing apparatus forms the whole image on the basis of the received image information.

Figure 5:
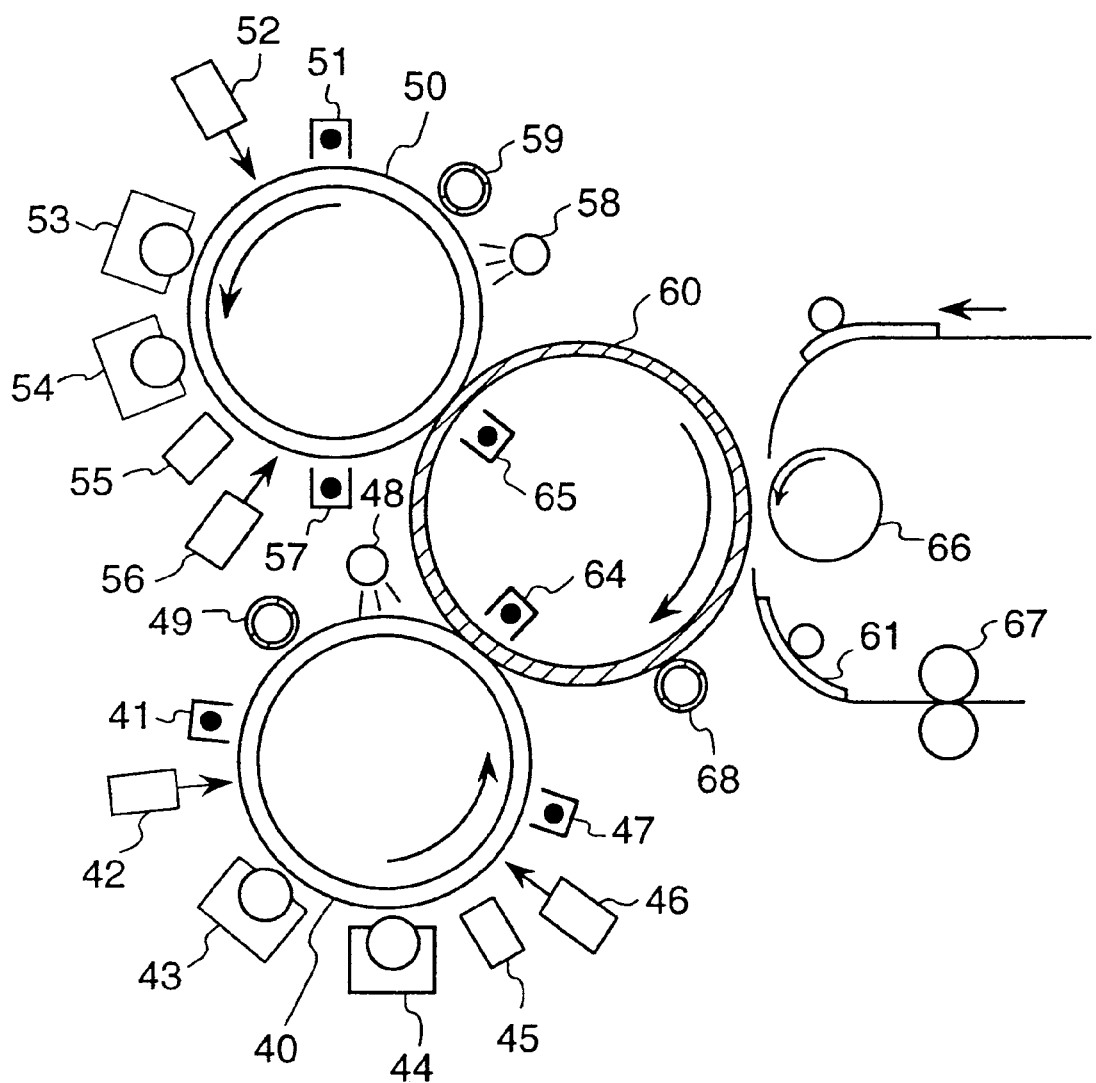
FIG. 5 is a schematic diagram of an electrophotographic printing apparatus to which the present invention is applied.

FIG. 5 is an example of the electrophotographic printing apparatus according to the present invention. This apparatus can print image information for two colors on a photosensitive member surface in one exposure, thereby to obtain a color image. Along the circumference of the first photosensitive member 40 in the direction of rotation thereof, there are disposed a first charging unit 41, a first main exposure unit 42, a first developing unit 43, a second developing unit 44, a first toner adhesion quantity sensor 45, a first auxiliary exposure unit 46, a first pre-transfer charging unit 47, a first charge releasing unit 48 and a first cleaning unit 49. Likewise, along the circumference of the second photosensitive member 50, there are disposed a second charging unit 51, a second main exposure unit 52, a third developing unit 53, a fourth developing unit 54, a second toner adhesion quantity sensor 55, a second auxiliary exposure unit 56, a second pre-transfer charging unit 57, a second charge releasing unit 58 and a second cleaning unit 59.

First, the printing method which takes place along the circumference of the first photosensitive member 40 will be explained. The surface of the first photosensitive member 40 is charged uniformly by the first charging unit 41. Then, image information for two colors (an electrostatic latent image) is formed by exposing the photosensitive member with an appropriate exposure quantity of light, in one exposure, using the first main exposure unit 42. The electric potential of the electrostatic latent image is determined by adjusting the exposure quantity at the exposure time. The relationship between the exposure quantity and the electric potential of the electrostatic latent image after exposure is measured in advance by using the photosensitive member and an optical system, and the relationship is memorized in the first main exposure unit 42 and in an exposure quantity operation unit in the second main exposure unit 52.

Figure 3:
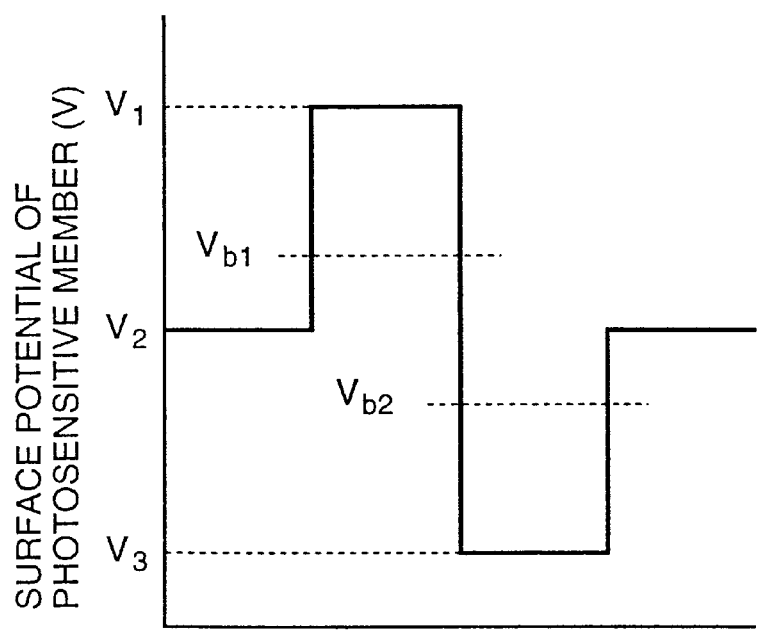
FIG. 3 is the surface potential distribution diagram for an ideal photosensitive member before developing.

The characteristics of the electrostatic latent image formed in accordance with the present invention will be explained by reference to FIG. 3, which shows the potential distribution of an electrostatic latent image wherein the image data for two colors is formed on the photosensitive member in one exposure. The photosensitive member surface is divided into parts where an initial charge potential $V_1$ produced by a charging unit is maintained, one part of which surface potential becomes $V_2$ where it is charged faintly and the other part of which surface potential becomes $V_3$ where it is strongly exposed by a main exposure unit. The developing bias of the developing unit for the parts $V_2$ and $V_3$ is set at proper electric potentials of $V_{b1}$ and $V_{b2}$, whereby a toner image is obtained through development. Toner does not adhere to a part having a surface potential of $V_2$, and this becomes the background part of the printing image.

The exposure quantity that produces the surface potential $V_2$ after exposure is called the standard exposure quantity. The parts having surface potentials after exposure of $V_1$ and $V_3$ are areas where a toner adheres. As mentioned above, the formed electrostatic latent images are developed by the first developing unit 43 of bias electric potential $V_{b1}$ and by the second developing unit 44 of bias electric potential $V_{b2}$, respectively.

The toners accommodated in the first developing unit 43 close to the first photosensitive member 40 and the second developing unit 44 are two kinds of toner having mutually different colors, one of which is a positive charging toner and the other is a negative charging toner. In this example, a developing agent containing a magenta (M) toner, which is positively charged, is accommodated in the first developing unit 43, and a developing agent containing a cyan (C) toner, which is negatively charged, is accommodated in the second developing unit 44. As for the developing agent, any agents which have been used heretofore, such as a single component developing agent or a two component developing agent, are acceptable.

If the toner quantity on the first photosensitive member 40 after development, as detected by sensor 45, is the first toner adhesion quantity, the picture quality is controlled to change the toner density of a developing agent or a developing bias potential on the basis of the detection results.

In the three level printing method, blue (B) cannot be represented because two kinds (C,M) of toners cannot be made to adhere to the same pixel at one potential. Therefore, an electrostatic latent image is formed in the area where color mixing should occur, so as to develop with toners having mutually different polarities (that is, a latent image is formed so that an area to which toner is not adhered should be as small as possible), and after developing with two kinds of toners, the electric charge of one of the toners on the surface of the first photosensitive member 40 is properly removed or reduced. When the polarity of both toners is adjusted, the toners can be mixed by an electrostatic force produced by the electric charge of the toners. As an example of the mixing method, it is conceivable to cause light to be irradiated, using the first auxiliary exposure unit 46, onto the positively charged toner image of the mixed color area of the first photosensitive member 40, thereby to reduce or remove the electric charge of the toner image. Thus, blue (B) is represented by mixing two kinds of toners.

As for the first auxiliary exposure unit 46, optical systems having a laser light source, a lens system and a polygon motor or an LED array, etc. may be employed. These elements also can be used as the first main exposure unit 42. After auxiliary exposure, the charge polarities of the two kinds of toners are adjusted to one polarity by a pre-transfer charging unit 47, and a toner image is transferred to an intermediate transfer body 60 in response to an electrostatic force produced by corona charger 64.

A change of the charge polarity of a toner before transfer to the intermediate transfer body 60 can be achieved by the corona discharging to the toner on the photosensitive member. There are corona discharging by direct current and corona discharging by alternating current. A corona discharging by direct current is indispensable to give the toner an electric charge. Also, it is possible to invert the charge polarity of the toner by charging it with direct current. When the corona discharging by alternating current is overlapped on the corona discharging by direct current, the charge polarity of toners can be inverted more efficiently. When an alternating current is imposed on the electric current, the air resistivity declines and corona discharging takes place easily, so that an inversion of the charge polarity becomes easy. The exposure of the surface of the first photosensitive member 40 with the first auxiliary exposure unit 46 contributes to an improvement of the inversion efficiency of the charge polarity of toners before transfer.

After transferring a toner image to the intermediate transfer body 60, the surface of the first photosensitive member 40 is subjected to charge releasing by the first charge releasing unit 48 and to cleaning by the first cleaning unit 49.

As mentioned above, a two color image is formed on the intermediate transfer body 60. However, there is a problem in this printing method that the toner image of the first color is likely to become thickened, and the toner image of the second color is likely to become thinned. This phenomenon will be explained by reference to FIG. 4 and FIG. 10.

Figure 4:
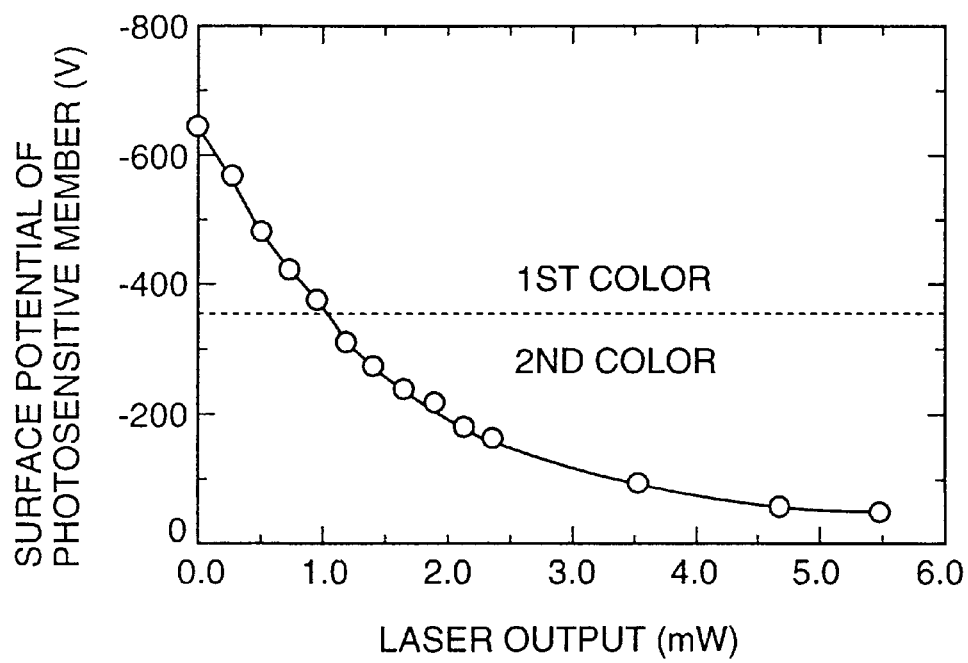
FIG. 4 is a graph which illustrates the exposure quantity of irradiation to the photosensitive member and the surface potential after exposure.

FIG. 4 illustrates the relationship of the exposure quantity of light irradiated on to the photosensitive member to the surface potential of the photosensitive member after exposure. Here, the case where the photosensitive member is charged negatively is considered. As the exposure quantity increases, the rate of change of the surface potential of the photosensitive member with respect to the exposure quantity after exposure becomes smaller. That is, in the small range of the exposure quantity (output of 1 mW or less), if the exposure quantity is changed is small increments, the surface potential of the photosensitive member after the exposure is greatly changed. But, it is necessary to greatly change the exposure quantity in order to change the surface potential of the photosensitive member at around −100 V.

Figure 10:
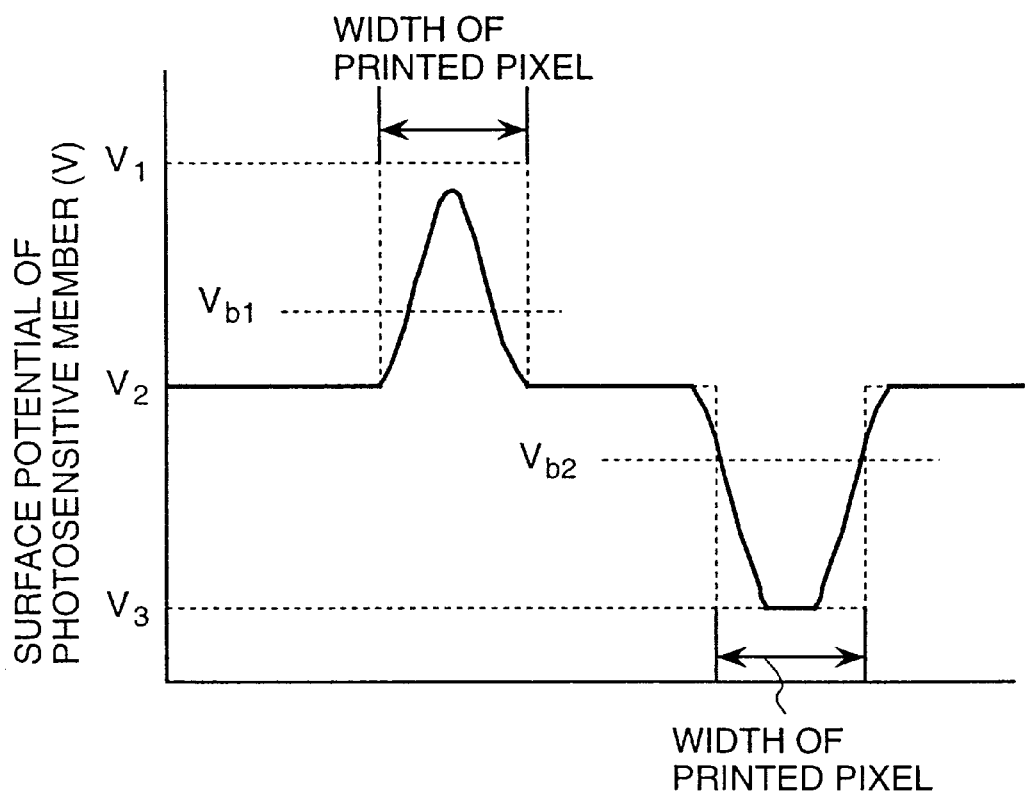
FIG. 10 is a surface potential distribution diagram for a photosensitive member after exposure thereof by a conventional method.

FIG. 10 shows the electrostatic latent image of a fine line recorded on the surface of the photosensitive member. In the line image (at the part of surface potential $V_1$) of the first color, the area which is not printed using the standard exposure quantity is exposed to form an adjoining background (part having the surface potential $V_2$) so that the actual printing area is thinner than that of the printing area of one pixel. Even if the optical beam is blinked on the basis of the data for each respective pixel, such an optical beam has an intensity distribution of Gauss-form in the printing area. Even if the area which is not printed is a normal pixel area, the printing area is irradiated with a light beam larger than the width of one pixel. As shown in FIG. 4, even if the exposure quantity for making the surface potential $V_2$ of the non-printing area is small, the surface potential $V_1$ of the printing area declines, if the area is irradiated with light. On the other hand, the line image (the part of the surface at potential $V_3$) of the second color is the part having a greatly reduced surface potential after exposure. Therefore, since the surface potential for one pixel in this part declines and the exposure quantity of light to be irradiated to the photosensitive member increases, the degree of lowering of the surface potential enlarges. Because the optical beam has an intensity distribution of Gauss-form, the line image of the second color becomes thicker than the line-width of the line image of the first color. There is a high rate in the presence of line images, such as in a character in the image to be printed by the electrophotographic recording apparatus. Therefore, it is necessary to adjust the line-width between two colors of the line images which are actually printed in case information of two colors is printed by one exposure. For this purpose, a control is necessary for presence or absence of exposure, beam shape, exposure time, etc. on the basis of the printing pixel information.

There are dot and line images, such as a solid area (face images), and a half tone of the images, printed by the electrophotographic printing apparatus, besides line images. Because the electric potential of the latent image abruptly changes within a short space in the line images, an electric field is generated by the latent image itself. Therefore, toner easily adheres to the circumferential portion of the latent image, thereby to thicken the lines easily. On the other hand, the electric field produced by the latent image itself does not exist, except for the circumferential portion of the image, as for the electric potential of the latent image in the face image. Therefore, toner is easier to adhere in the line image than in the face image. This phenomenon notably appears in development of a line image of the second color.

In development of the first color of a line image, toner will more easily adhere in development of the face image, because there is only a small difference in the electric potential of the line images from that of the background, so that it is difficult to cause the toner to adhere, as explained with reference to FIG. 10.

In the case of dot images, it is hard to cause toner to adhere, because a difference in electric potential of the background from that of the line images is small, irrespective of whether it is the first color or the second color. A control of the exposure is necessary to form the electric potential of a latent image, thereby to obtain a toner image, considering the printing characteristics for every color of all kinds of images.

Figure 1:
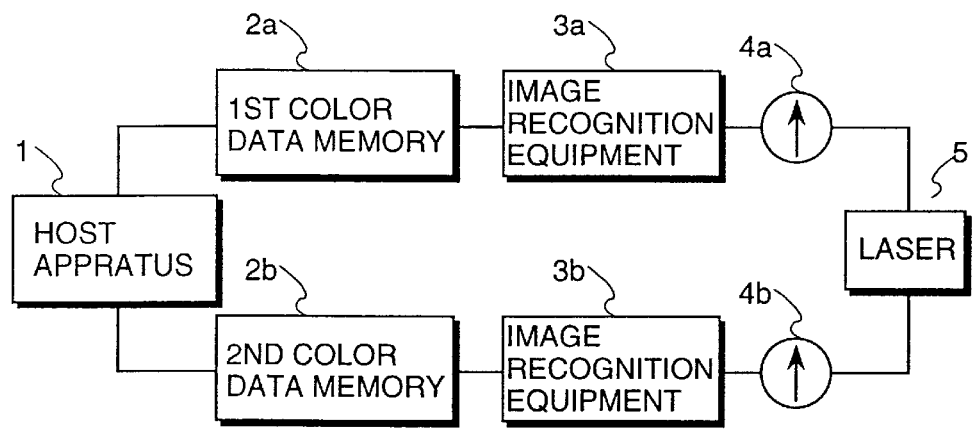
FIG. 1 is a block diagram of a unit for controlling an exposure quantity according to the present invention.

Thus, a method of determining an exposure quantity on the basis of pixel information will be explained by reference to FIG. 1. The image information being sent from the host equipment 1, such as a computer, to an electrophotographic printing apparatus comprises pixel data for each color and is stored in the first color data memory 2a and the second color data memory 2b. The exposure information in the main exposure device and an electric current quantity supplied to laser 5 are determined by using image recognition devices 3a and 3b that judge whether the pixel information is related to what part of the image. The output of laser 5 is changed by changing the electric current supplied from electric current source 4a for recording the first color information, thereby to form an electric potential of the background and an electric potential of the first color (initial electric potential). And, the luminous quantity of laser 5 is increased by supplying an electric current from electric current source 4b to form an electric potential of the second color.

Figure 14A:
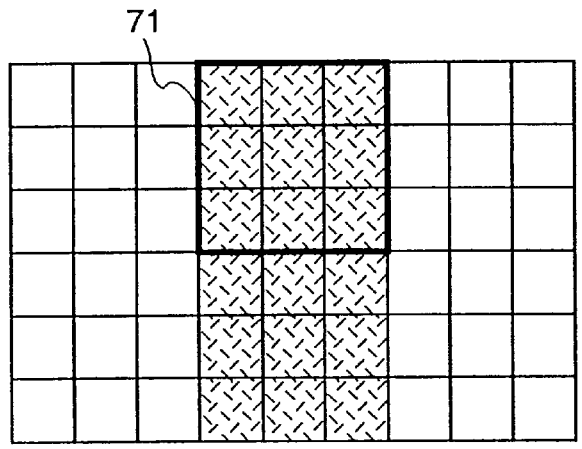
FIGS. 14(a) to 14(c) are diagrams which illustrate a method of recognizing fine lines.

A method of recognizing part of the image to be printed will be described in an example of recognizing an image by using a template 71 of 3×3 pixels on a fine line. FIG. 14(a) shows that template 71 completely overlaps the fine line. In this case, the exposure quantity of the central pixel (hereinafter referred to as a noticed pixel) of template 71 is zero in case a fine line is of the first color, and the surface potential of the photosensitive member after exposure becomes $V_3$ in case the fine line is of the second color, (this exposure quantity is defined as exposure quantity 1).

Figure 14B:
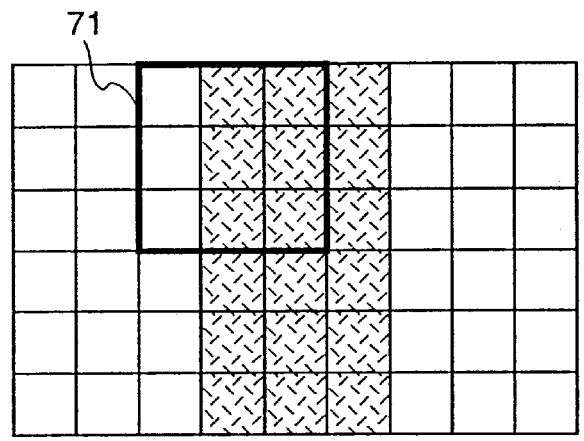

FIG. 14(b) shows the state wherein template 71 overlaps only part of the fine line, and, in this case, the noticed pixel falls adjacent the edge on the fine line. When the fine line is the of first color, the exposure quantity of the noticed pixel is zero, but when the fine line is of the second color, the exposure charge is between exposure quantity 1 and the standard exposure quantity. This is to prevent thickening of the fine line by making the exposure quantity smaller than exposure quantity 1. The exposure quantity is determined, depending on the printing conditions of the electrophotographic printing apparatus.

Figure 14C:
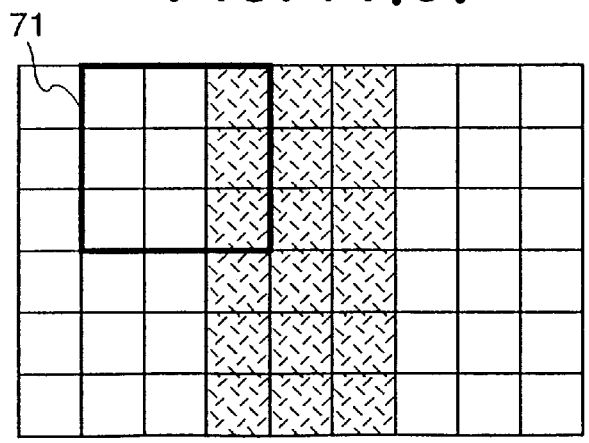

FIG. 14(c) shows that template 71 overlaps only a small part of the fine line and that the noticed pixel has moved off of the fine line. The exposure quantity of the noticed pixel in this case is one which is smaller than the standard exposure quantity in case the fine line is of the first color. The exposure quantity is determined depending on printing conditions of the electrophotographic printing apparatus. Thinning of fine lines can be suppressed by exposure with a minute amount of exposure even if the noticed pixel is not a printing pixel. In case fine lines are of the second color, the noticed pixel is exposed using the standard exposure quantity in accordance with the image information.

In this way, thickening and thinning of fine lines can be suppressed by controlling exposure to a proper exposure amount for every color to be printed on the basis of the recognition result produced by template 71.

Figure 2:
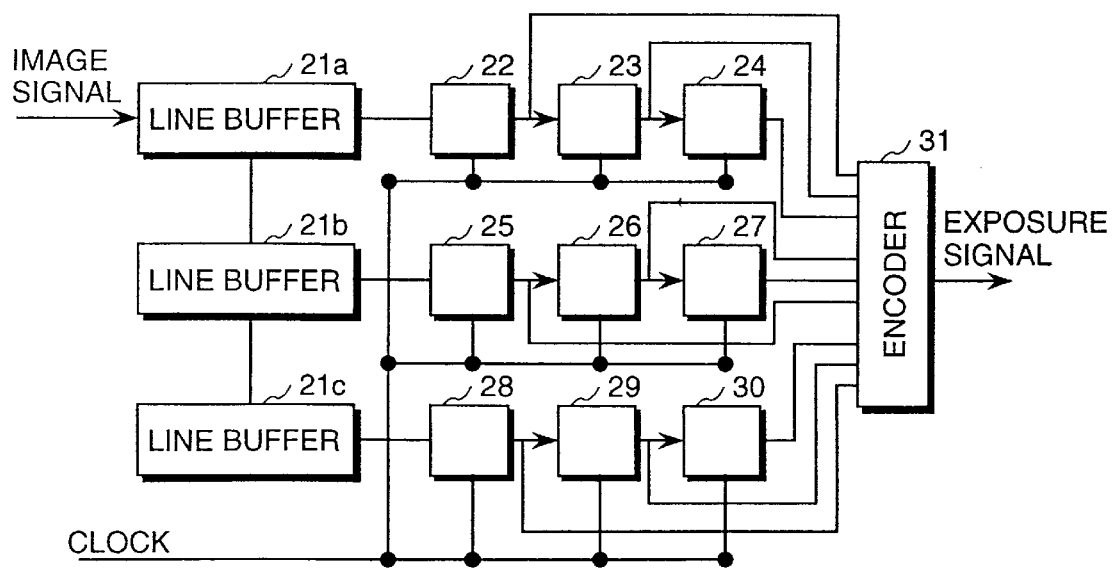
FIG. 2 is a block diagram of an example of a unit for recognizing an image according to the present invention.

Now, a method of calculating the exposure quantity for actually exposing the photosensitive member surface will be explained by reference to FIG. 2, which shows an example of image recognition equipment 3a and 3b using template 71.

The pixel information is sent as an image signal from host equipment 1 to line buffer 21a. Line buffer 21a has the capacity necessary for storing the pixel information of one line. Whenever the scanning of one line ends, image information is sent to the next line buffer 21b or 21c. Latches 22–30 hold the data of one pixel. In synchronism with a clock, the data stored in line buffers 21a, 21b and 21c are sent to the latches on the right side for every one pixel. For example, the data in buffer 21a is sent in order to the latches 22, 23 and 24. The data (information held in latch 26) concerning the noticed pixel and eight data around the circumference thereof are read by an encoder 31, and the signals sent to electric current source 4a or 4b are calculated on the basis of the result FIG. 6 illustrates an example of detecting a kind of image by a pixel pattern for a part of a circle using a 3×3 template 71. Moving template 71 in the main scanning direction, the central pixel (noticed pixel) is judged to determine to what part of the image the pixel belongs. FIGS. 7(a) to 7(d) illustrate examples of pixel information judged by the method shown in FIG. 6. In case all pixels positioned within template 71 are printing pixels, the image is recognized as a face image. In the following, a change of the exposure quantity according to the kind of image will be explained. FIGS. 7(a)–7(c) illustrate line images. FIGS. 7(a) and 7(b) are examples in which the noticed pixel is part of the line image. As mentioned above, in printing the second color, the toner of line images adheres more easily, compared with the toner of face images. Thus, by making the exposure quantity of the noticed pixel smaller than that of the face image when the noticed pixel is recognized as part of a line image, the gradient of the latent image electric potential becomes proper, so that the toner adhesion quantity becomes proper and a line image corresponding to the image information is obtained. The difference in exposure quantity between a line image and a face image is determined depending on the resolution and the printing speed of the electrophotographic printing apparatus.

FIG. 7(c) represents a slanting line. Generally speaking, in the case of a slanting line, the connection of toner between pixels is weaker than in the cases of vertical lines and side lines. Since the overlapping of slanting lines between pixels is less than that of vertical lines and horizontal lines, the exposure quantity for slanting lines may be set to be larger than that for vertical lines and horizontal lines. FIG. 7(d) represents a dot image. The electric potential of the electrostatic latent image of the dot image will easily approach that of the background part of the surrounding area, because the exposure light beams do not continue and because the potential does not fall to the normal electric potential when the exposure quantity is lowered. Therefore, the exposure quantity for a dot image is such that strong exposure may be used similar to that for a face image.

The above explanation concerns a method of calculating the exposure quantity of an image for the second color. Now, a method for calculating the exposure quantity of an image for the first color will be explained. Because the difference in electric potential of the latent image of a line image of the first color is small compared with the electric potential of the background of the surrounding area, a small amount of toner adheres at the time of developing. As was explained with reference to FIG. 14(c), in the state where template 71 overlaps only a small part of the fine line and the noticed pixel is located off the body of the fine line, a thinning of the line is suppressed by exposing the noticed pixel with a minute amount of exposure.

Figure 8:
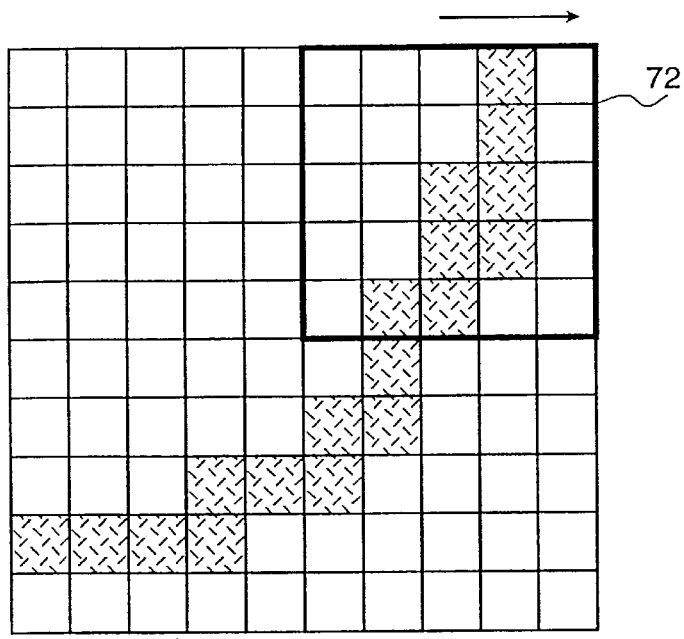
FIG. 8 is a diagram which illustrates the image recognition method of the present invention.
Figures 9A, 9B, 9C, 9D, 9E:
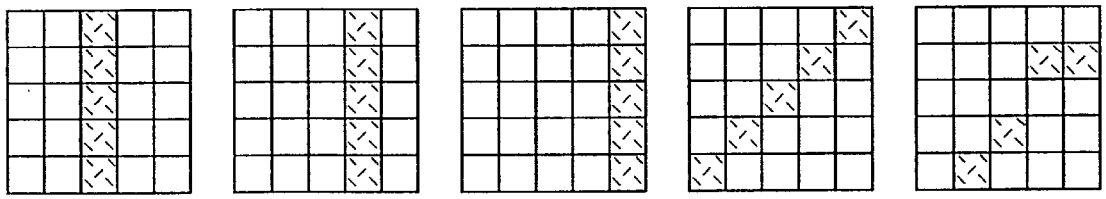
FIGS. 9(a) to 9(j) are diagrams which illustrate an image pattern to be detected.
Figures 9F, 9G, 9H, 9I, 9J:
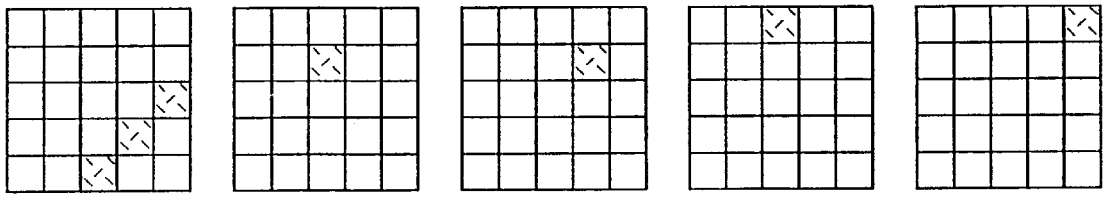

When the resolution of an electrophotographic printing apparatus increases, a template larger than 3×3 template 71 is needed because the space between pixels becomes small. For example, the use of a 5×5 template will be is explained. FIG. 8 shows an example of image recognition by using 5×5 template 72. FIGS. 9(a)–9(j) show examples of line images at dot images. FIG. 9(a) shows that the noticed pixel is part of the line image, FIG. 9(b) shows an example in which the noticed pixel is remote by one pixel from the line image, and FIG. 9(c) shows an example in which the noticed pixel is remote by two pixels from the line image. Because in the case of FIG. 9(a) the noticed pixel is a printing pixel, it is natural that the pixel is not exposed so as not to print the pixel. In case of FIG. 9(b), when a reference pixel is not exposed, the line-width at the time of printing can be enlarged. In addition, when a notice pixel is exposed even in the case of FIG. 9(c), the line-width can be enlarged further. This is the same as the slanting lines shown in FIGS. 9(d), 9(e) and 9(f), and the line-width can be enlarged in the order of 9(d)→9(e)→9(f) by the method of creating exposure information. In the case where there is a dot image in a position where one pixel comes off noticed pixels as in FIGS. 9(g) and 9(h), the area of the dot image at the time of printing is enlarged when the noticed pixel is not exposed. In addition, when the noticed pixel is not exposed, if there is a dot image in a position remote by two pixels from the noticed pixel, as in FIGS. 9(i) and 9(j), the area of the dot image is enlarged further. As mentioned above, the exposure method is determined so that the line-width of the line image of the first color and the area of the dot image become equal to those of the second color.

Because the space per one pixel is small in an electrophotographic printing apparatus having a high resolution, it is necessary to use a template for the first color and the second color which is larger than the one described above. In general, the larger the template, the better is the recognition of various images which can be obtained. In accordance with the above-mentioned control, the color image of the line-width along with data sent from the host equipment to the electrophotographic printing apparatus can be actually printed.

Returning to FIG. 5, the method of printing using the second photosensitive member 50 will be described. For the second photosensitive member 50, like the first photosensitive member 40, the surface of the second photosensitive member 50 is uniformly charged by the second main charging unit 51 and then is exposed with a predetermined exposure amount by the second main exposure unit 52. The third developing unit 53, the development method at the fourth developing unit 54, and the operation and function of the second toner adhesion quantity sensor 55 are the same as those elements provided at the circumference of the first photosensitive member 40.

After development, the toner image on the second photosensitive member 50 is transferred to the surface of intermediate transfer body 60 by the electrostatic force produced by the corona charger unit 65 without a position dislocation. The toner image on the intermediate transfer body 60 is transferred, by means of transfer roll 66 to which a voltage is applied, onto a recording medium 61 (cut paper, continuous paper, OHP sheet, etc.), which is fed by transfer unit 62. Then, the recording medium 61 is transferred to fixing unit 67, and the toner image is fixed on the surface of the recording medium 61 by heat and pressure to complete the color image. Any toner that remains on intermediate transfer body 60 after transferring the toner image to recording medium 61 is removed by intermediate transfer body cleaning unit 68 for cleaning intermediate transfer body 60.

The above structure has two sets of photosensitive member drums, as shown in FIG. 5. A color toner image is formed on the middle transfer drum by forming a toner image of two colors on each of the photosensitive member drums and transferring the formed toner image on the middle transferring drum. However, the present invention is not limited to this structure. For example, the photosensitive member can be provided in the form of a belt with four developing unit being arranged along the circumference of one photosensitive member belt, so that a toner image having four colors can be formed while the photosensitive member rotates one time (the necessary over-all length of the belt is two pixels in this case) or two times.

As mentioned above, according to a present invention, a proper exposure quantity can be determined and a clear image can be printed by changing the sizes of the template used for image recognition in the area using positively polarized toner and the area using negatively polarized toner.

EXAMPLE 2

In this example, another method of correcting the thinning of an image of the first color will be explained by reference to FIG. 10. The cause of thinning of an image is that, even if an optical beam is blinked on the basis of the data of every pixel, an intensity distribution exists in the optical beam, and thus the latent image electric potential in the area of a line image of the first color approaches the electric potential of the background. Therefore, it may be suggested that the diameter of an exposing optical beam should be made small, for a pixel in the area of the background, which is a boundary of the first color, or that the exposure quantity should be decreased. But, this method has a small effect to enlarge the line-width, compared with making the exposure quantity zero, which was described in Example 1, and so it is necessary to enlarge the difference in the size between the template 71 of the first color and template 72 of the second color.

The method of changing the beam diameter of the exposure device on the basis of pixel data will be explained by reference to FIGS. 9(*a*) to 9(*j*). Like FIGS. 9(*b*) and 9(*e*), the beam diameter for irradiating the noticed pixel is controlled, when the noticed pixel is recognized as a pixel in the background adjoining the first color. As in the case of FIGS. 9(*c*) and 9(*f*), even if the noticed pixel is recognized as a pixel in the background which is remote by two pixels from the first color, the beam diameter must be made small. In addition, if the size of template 72 is 7×7, the noticed pixel can be recognized as a pixel in the background which is remote by three pixels from the pixel of the first color. When the beam diameter of the light is controlled in this case, the width of the line image is expanded. The method of recognizing the pixels of the second color and the method of exposure are similar to those of Example 1.

Figure 11:
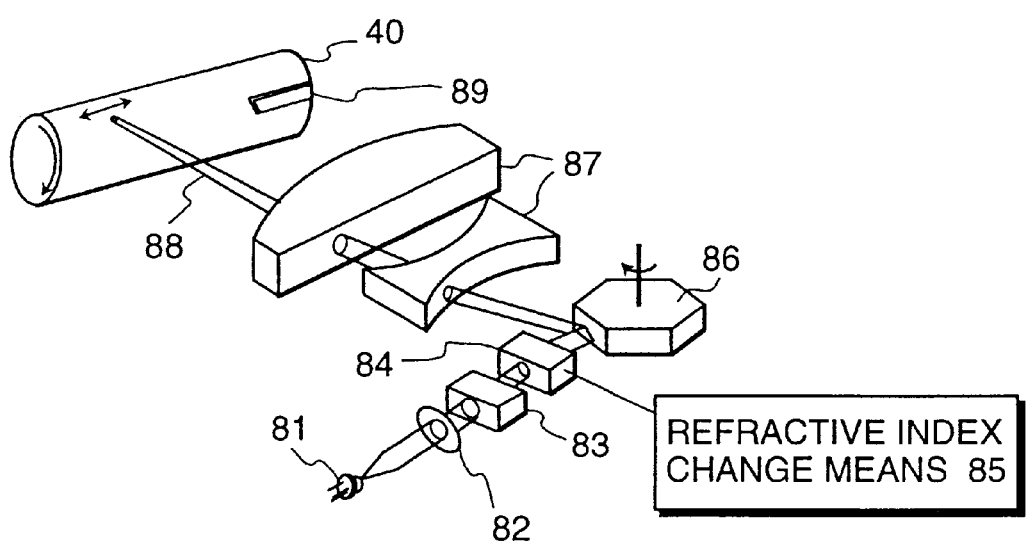
FIG. 11 is a schematic diagram which illustrates the exposure means by which the spot size of a beam can be changed.

Then, a method of changing the beam diameter of the exposure device will be explained by reference to FIG. 11 and FIG. 12. FIG. 11 shows the optical system of the exposure device for exposing the photosensitive member, which system includes a laser 81, a collimator lens 82, a lens 83, a photo-functional element 84, a unit 85 for changing the refractive index of photo-functional element 84, a rotary mirror 86, an Fθ lens 87, an optical beam 88 and a surface potential sensor 89. The light of laser 81 is conducted to photo-functional element 84 and rotary mirror 86 through the lenses 82 and 83. Optical beam 88 is caused to scan the surface of photosensitive member 40 by rotating rotary mirror 86. Photo-functional element 84 on the halfway is made of a material having a refractive index which changes when a voltage is applied to it from the outside. For example, $LiNbO_3$, is such a material. The structure of the photo-functional element will be explained by reference to FIG. 12.

Figure 12A:
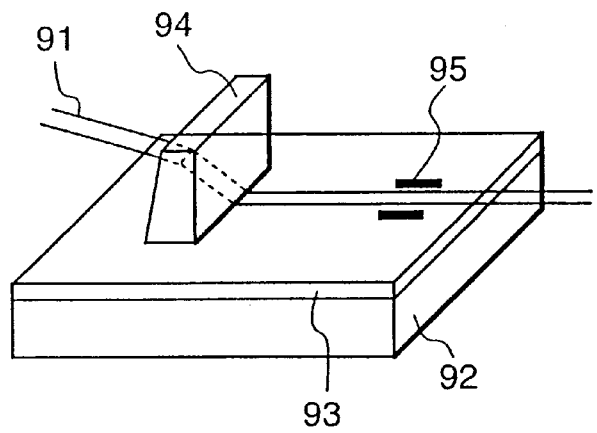
FIG. 12(a) is a diagram of a unit for changing the spot size.
Figure 12B:
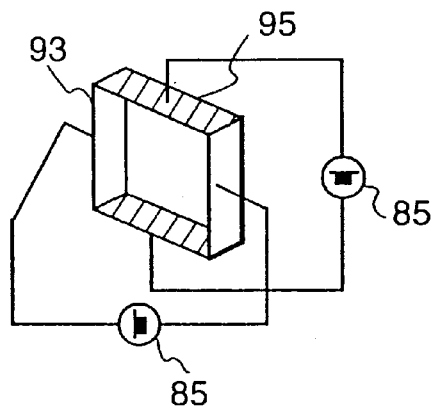
FIG. 12(b) is a diagram of a component part of that unit.

FIG. 12(*a*) is the diagram of the photo-functional element, wherein 91 denotes is an optical beam, 92 denotes a substrate (Ti, etc. are used), 93 denotes a waveguide ($TiNbO_3$, etc.), 94 denotes a prism and 95 denotes an electrode. Optical beam 91 impinges on wave layer 93 formed on substrate 92 through prism 94 and propagates through the wave layer. Electrode 95 is provided in the wave layer 93 around the beam path. FIG. 12(*b*) shows segmented parts where electrode 95 exists around the wave layer 93. On the basis of a signal which is issued to electrode 95 for changing the beam diameter and which is provided as a result of image recognition around the wave layer 93, the voltage of power source 85 for changing the refractive index is changed so that the refractive index of the wave layer is changed. The refractive index changes the shape of optical beam 91 during the propagation thereof. Because the changing degree of the refractive index depends on the voltage applied, the beam diameter of optical beam 91 can be changed by adjusting the voltage in the top and bottom directions and in the right and left directions of the wave layer as shown in the figure.

As mentioned above, thinning of the line image of the first color can be suppressed by adjusting the beam diameter of the light to be irradiated onto the pixels located at the boundary between the first color and the background, and the color image of a line-width according to the pixel information from the host equipment can be actually printed.

The same effect as obtained by the above method is obtained by decreasing the exposure quantity for the above pixels. The amount of change of the exposure quantity depends on the sensitivity of the photosensitive member. The sensitivity of the photosensitive member is determined by the temperature of the environment in which the photosensitive member is used and frequency, etc.

Figure 13:
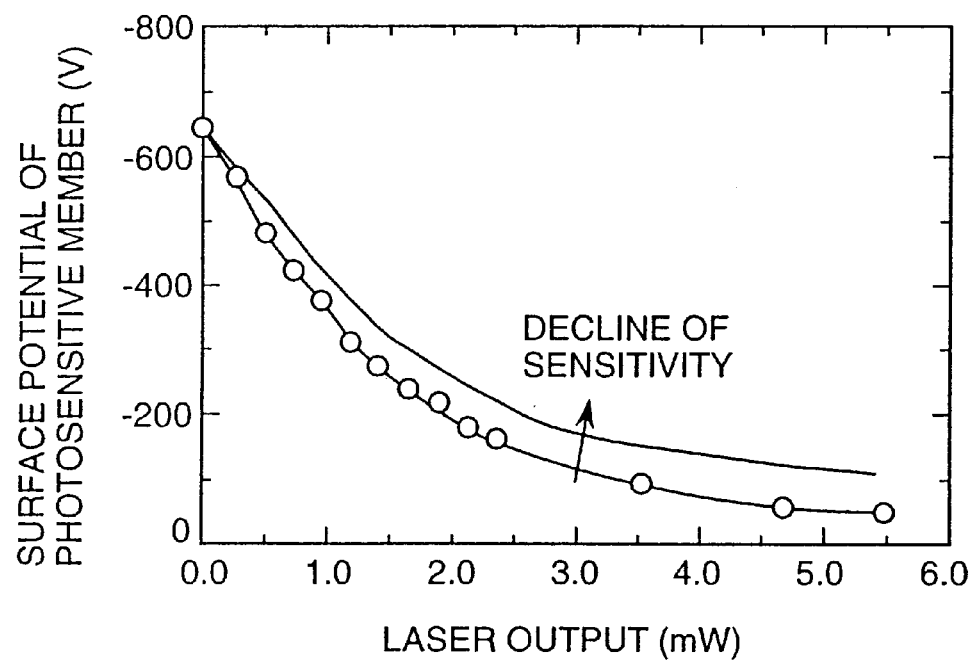
FIG. 13 is a graph which illustrates a relationship between the exposure quantity of irradiation to the photosensitive member and a surface potential after exposure in case the sensitivities of the photosensitive members are different.

FIG. 13 shows the relationship between the exposure quantity and the surface potential of the photosensitive member after the exposure in a case where the sensitivity of the photosensitive member changes. The initial charge potential is made constant at −650 V. Factors for reducing the sensitivity of the photosensitive member are exemplified by an increase in frequency of use (the number of printing pages) and a lowering of the temperature of the environment where printing occurs. It is necessary to set up sequence for measuring the sensitivity of the photosensitive member periodically because the surface potential of the photosensitive member after exposure determines the quality of the printing image.

A method of measuring the sensitivity of a photosensitive member will be explained by reference to FIG. 11. Photosensitive member 40 is charged uniformly, followed by the scanning of the surface thereof with rotary mirror 86, and then the intensity of the laser beam 81 is increased gradually. Next, the surface potential of the photosensitive member after the exposure is measured by surface potential sensor 89 to obtain data like that shown in FIG. 13. The color image is obtained by determining the exposure quantity, and the developing bias electric potential is determined on the basis of the result, along with the developing characteristics of the developing agent. Picture quality control on the basis of image data becomes certain by establishing this periodic sequence.

In the electrophotographic printing apparatus for obtaining a color image using several kinds of toners having different charging characteristics, there is provided a unit for determining the method of recognizing what part of the image shown by the pixel data is being sent from the host equipment. The method is determined for every color, and on the basis of the result of recognition, the exposure data for every color to be printed is created or an exposure beam diameter is controlled. As a result, the color image of the line-width can be actually printed in accordance with data received from the host equipment by the electrophotographic printing apparatus.

What is claimed is:

1. An electrophotographic printing apparatus, comprising:
   a charging unit for uniformly charging the surface of a photosensitive member;
   an exposure unit for forming an electrostatic latent image having at least three levels of electric potential on the photosensitive member surface by exposing said photosensitive member surface in accordance with input image information containing pixel data;
   a developing unit for developing said electrostatic latent image using two or more kinds of toners with mutually different charge polarities to form a toner image;
   a template determination unit for determining a recognition template on the basis of the pixel data of said image information;
   a recognizing unit for recognizing an image pattern from said pixel data by using the determined recognition template; and
   a unit for controlling said exposure unit to control the exposure of said photosensitive member surface by calculating the exposure quantity of each pixel of said input image information on the basis of the recognized image pattern.

2. The electrophotographic printing apparatus of claim 1, wherein said template determination unit selects a small template when it judges, on the basis of said pixel data, the area that is exposed by an exposure amount which is larger than the standard exposure quantity of irradiation to be an area to which toner does not adhere, and when it judges the area to be exposed by an exposure amount which is smaller than the standard exposure quantity, a large template is selected.

3. The electrophotographic printing apparatus of claim 1, wherein said recognizing unit recognizes a line image, a face image and a dot image based on pixel data in the input image information, and said exposure quantity determination mean calculates exposure information so as to make smaller the number of pixels to be actually exposed on the photosensitive member by the standard exposure quantity than the number of exposure pixels of the inputted pixel data to be exposed by the standard exposure quantity.

4. The electrophotographic printing apparatus of claim 1, wherein the recognizing unit recognizes a line image, a face image and a dot image based on pixel data in the input image information, and said exposure quantity determination unit calculates exposure information on the basis of the recognition result so that the exposure quantity for an exposed pixel which adjoins a not exposed pixel is smaller than the standard exposure quantity.

5. The electrophotographic printing apparatus of claim 1, wherein said recognizing unit recognizes a line image, a face image and a dot image based on pixel data in the input image information, and said exposure quantity determination unit is further provided with a changing unit for changing an optical beam diameter of a light beam produced by said exposure unit so that the optical beam diameter for exposing pixels that adjoin not exposed pixels on said photosensitive member surface is made smaller than that of a standard exposure quantity.

6. The electrophotographic recording apparatus of claim 1, wherein said recognizing unit recognizes a line image, a face image and a dot image based on pixel data in the input image information, and the said exposure quantity determination unit calculates exposure information based on the result of said recognition so that the exposure quantity of a line image area is made smaller than the exposure quantity of a face image and a dot image area in the image area to be exposed by an exposure amount larger than a standard exposure quantity.

7. The electrophotographic printing apparatus of claim 1, which further comprises a characteristic measurement unit for measuring sensitivity characteristics of said photosensitive member, wherein said exposure quantity determination unit calculates the exposure quantity of irradiation to said photosensitive member on the basis of measured sensitivity characteristics.

8. The electrophotographic printing apparatus of claim 7, wherein said characteristic measurement unit is composed of a unit for changing stepwise the exposure quantity in the main exposure device and unit for measuring the surface potential of the photosensitive member after exposure.

9. An electrophotographic printing apparatus, comprising:
   a charging unit for uniformly charging the surface of a photosensitive member;
   an exposure unit for forming an electrostatic latent image having three levels of electric potential on the photosensitive member surface by exposing said photosensitive member surface based on input image information containing pixel data;
   a plurality of developing units for developing said electrostatic latent image to form a toner image using at least two kinds of toners, each having different charging characteristics;

a template determination unit for determining, on the basis of the pixel data of said image information, a recognition template to be used for recognition;

a recognition unit for recognizing a line image, a face image and a dot image on the basis of the pixel data by using said determined recognition template; and an exposure quantity determination unit for controlling said exposure unit to control the exposure of said photosensitive member surface by calculating exposure information in the image area to be exposed by an exposure amount larger than the standard exposure quantity so that the exposure quantity of a line image area is smaller than the exposure quantity of face image and dot image areas.

* * * * *